United States Patent

Suzuki et al.

[11] Patent Number: 5,898,060
[45] Date of Patent: Apr. 27, 1999

[54] COPOLYESTER FOR MOLDING A BOTTLE

[75] Inventors: Minoru Suzuki; Kimihiko Sato, both of Matsuyama, Japan

[73] Assignee: Teijin Limited, Osaka, Japan

[21] Appl. No.: 09/134,037

[22] Filed: Aug. 14, 1998

[30] Foreign Application Priority Data

Aug. 18, 1997 [JP] Japan .................................. 9-221343
Aug. 18, 1997 [JP] Japan .................................. 9-221344

[51] Int. Cl.⁶ .......................... B29D 22/00; C08G 63/02
[52] U.S. Cl. .................. 428/35.7; 528/280; 528/283; 528/286; 528/298; 528/302; 528/308; 528/308.6; 528/503; 524/706; 524/779; 524/783; 524/785; 428/36.9; 428/36.92
[58] Field of Search .................... 528/280, 283, 528/286, 298, 302, 308, 308.6, 503; 524/706, 779, 783, 785; 428/35.7, 36.9, 36.92

[56] References Cited

U.S. PATENT DOCUMENTS

| | | | |
|---|---|---|---|
| 4,340,721 | 7/1982 | Bonnebat et al. | 528/272 |
| 5,270,444 | 12/1993 | Shiraki et al. | 528/499 |
| 5,294,695 | 3/1994 | Lee et al. | 528/279 |
| 5,412,063 | 5/1995 | Duh et al. | 528/272 |
| 5,449,701 | 9/1995 | Duh | 521/182 |
| 5,597,891 | 1/1997 | Nelson et al. | 528/481 |
| 5,601,780 | 2/1997 | Occhiello et al. | 264/523 |
| 5,648,032 | 7/1997 | Nelson et al. | 264/101 |
| 5,650,469 | 7/1997 | Long et al. | 525/425 |
| 5,656,221 | 8/1997 | Schumann et al. | 264/85 |
| 5,736,621 | 4/1998 | Simon et al. | 528/271 |

*Primary Examiner*—Samuel A. Acquah
*Attorney, Agent, or Firm*—Sughrue, Mion, Zinn, Macpeak & Seas, PLLC

[57] ABSTRACT

A copolyester for molding a bottle which comprises 95 to 87 mol % of naphthalenedicarboxylic acid and 5 to 13 mol % of terephthalic acid as dicarboxylic acid components and a diol component consisting essentially of ethylene glycol, has an acetaldehyde content of 20 ppm or less and an intrinsic viscosity of 0.40 to 0.85 dl/g, and produces acetaldehyde in an amount of 30 ppm or less when the copolyester is kept molten with stirring at 300° C. for 5 minutes.

11 Claims, No Drawings

COPOLYESTER FOR MOLDING A BOTTLE

The present invention relates to a copolyester for molding a bottle. More specifically, it relates to an ethylene-2,6-naphthalene dicarboxylate/ethylene terephthalate copolyester for molding a bottle, which has high thermal stability, produces a small amount of acetaldehyde when it is kept molten and is excellent in color and transparency.

Polyethylene-2,6-naphthalene dicarboxylate which is excellent in color and transparency is disclosed in the following publications and is already known.

JP-A 7-48440 (the term "JP-A" as used herein means an "unexamined published Japanese patent application") discloses a process for producing an aromatic polyester as a raw material for providing a film having excellent surface flatness and resistance to dry heat deterioration. In this method, a magnesium compound, calcium compound, germanium compound and phosphorus compound are added to a reaction system in amounts that satisfy the following expressions (11) to (14) before a polymerization reaction goes to completion:

$$2.1 \leq (Mg+Ca) \leq 5.1 \quad (11)$$

$$1.0 \leq Mg/Ca \leq 6.0 \quad (12)$$

$$1.6 \leq (Mg+Ca)/P \leq 7.0 \quad (13)$$

$$0 \leq Ge \leq 1.5 \quad (14)$$

wherein Mg, Ca, Ge and P indicate the numbers of moles of magnesium element, calcium element, germanium element and phosphorus element, based on $10^6$ g of an aromatic dicarboxylic acid component constituting the aromatic polyester, respectively.

JP-A 7-109340 discloses a polyethylene naphthalene dicarboxylate composition which contains magnesium, calcium, phosphorus and germanium compounds in amounts that satisfy the following expressions (21) to (24):

$$2.6 \leq (Mg+Ca) \leq 4.1 \quad (21)$$

$$1.3 \leq Mg/Ca \leq 6.0 \quad (22)$$

$$1.0 \leq P/(Mg+Ca) \leq 1.5 \quad (23)$$

$$1.0 \leq Ge \leq 3.0 \quad (24)$$

wherein Mg, Ca, P and Ge are the same as defined in the above expressions (11) to (14), and an ammonium compound represented by the following formula (25) in an amount of 0.04 to 0.4 mole based on $10^6$ g of an acid component constituting the polyester:

$$(R^1R^2R^3R^4N^+)A^- \quad (25)$$

wherein $R^1$, $R^2$, $R^3$ and $R^4$ are each a hydrogen atom, an alkyl group, a cycloalkyl group, an aryl group or a derivative group thereof or $R^3$ and $R^4$ may form a ring, and $A^-$ is a residual anion group.

JP-A 8-113632 discloses polyethylene naphthalene dicarboxylate for a bottle, which contains magnesium, calcium, phosphorus and germanium compounds in amounts that satisfy the following expressions (31) to (34):

$$2.6 \leq Mg+Ca \leq 6.0 \quad (31)$$

$$1.3 \leq Mg/Ca \leq 6.0 \quad (32)$$

$$1.0 \leq P/(Mg+Ca) \leq 1.5 \quad (33)$$

$$1.0 \leq Ge \leq 3.0 \quad (34)$$

wherein Mg, Ca, P and Ge are the same as defined in the above expressions (11) to (14), and a phosphonium compound represented by the following formula (35) in an amount of 0.03 to 0.5 mole, based on $10^6$ g of an acid component constituting the polyester:

$$(R^1R^2R^3R^4P^+)A^- \quad (35)$$

wherein $R^1$, $R^2$, $R^3$, $R^4$ and $A^-$ are the same as defined in the above formula (25).

JP-A 8-92362 discloses polyethylene naphthalene dicarboxylate for a bottle, which contains magnesium, calcium, phosphorus, germanium and cobalt compounds in amounts that satisfy the above expressions (31), (32) and (34) and the following expressions (41) and (42):

$$0.1 \leq Co \leq 0.4 \quad (41)$$

$$1.0 \leq P/Co+Mg+Ca \leq 1.5 \quad (42)$$

wherein P, Mg and Ca are the same as defined in the above expressions (11) to (13) and Co indicates the number of moles of cobalt element, based on $10^6$ g of a dicarboxylic acid component constituting the polyester, and an ammonium compound represented by the above formula (25) in an amount of 0.04 to 0.4 mole, based on $10^6$ g of an acid component constituting the polyester.

JP-A 9-77859 discloses polyethylene naphthalene dicarboxylate for a bottle, which contains cobalt, magnesium, calcium, phosphorus and germanium compounds in amounts that satisfy the following expressions (51) to (55):

$$0.05 \leq Co \leq 0.40 \quad (51)$$

$$2.0 \leq Mg+Ca \leq 6.0 \quad (52)$$

$$1.3 \leq Mg/Ca \leq 6.0 \quad (53)$$

$$1.0 \leq P/(Co+Mg+Ca) \leq 1.5 \quad (54)$$

$$1.0 \leq Ge \leq 3.0 \quad (55)$$

and further an ammonium compound having an intrinsic viscosity, measured at 35° C. in a mixed solvent consisting of 3 parts by weight of phenol and 2 parts by weight of tetrachloroethane, in the range of 0.60 to 0.80 dl/g and represented by the above formula (25) in an amount of 0.04 to 0.4 mole, based on $10^6$ g of an acid component constituting the polyester as required.

JP-A 6-340734 discloses a method for producing polyester naphthalate that can provide a film having excellent surface flatness and that shows a good electrostatic adhesion. In this method, magnesium, calcium, phosphorous and antimony compounds are added to a reaction system in such amounts that satisfy the following expressions (61) to (64) when a lower alkylester of naphthalene dicarboxylic acid is reacted with ethylene glycol to produce polyethylene naphthalate:

$$2.6 \leq Ca+Mg \leq 3.7 \quad (61)$$

$$1.3 \leq Mg/Ca \leq 6.0 \quad (62)$$

$$2.3 \leq (Ca+Mg)/P \leq 7.0 \quad (63)$$

$$0.4 \leq Sb \leq 2.0 \quad (64)$$

wherein Mg, Ca, Sb and P indicate the number of moles of magnesium element, calcium element, antimony element and phosphorus element, based on $10^6$ g of an aromatic dicarboxylic acid component constituting the aromatic polyester, respectively.

JP-A 7-82464 discloses a polyethylene naphthalate composition for sensitized material for photograph, which contains magnesium element, calcium element, phosphorus element and antimony element, each of which is derived from a magnesium compound, a calcium compound, a phosphorus compound and an antimony compound respectively, in polyethylene naphthalate in such amounts that satisfy the following expressions (71) to (74):

$$2.6 \leq Mg+Ca \leq 4.0 \tag{71}$$

$$10 \leq Mg/Ca \leq 6.0 \tag{72}$$

$$0.5 \leq (Mg+Ca)/P \leq 1.5 \tag{73}$$

$$0.5 \leq Sb \leq 2.0 \tag{74}$$

wherein Mg, Ca, P and Sb are the same as defined in the above expressions (61) to (64).

JP-A 7-258395 discloses a polyethylene naphthalene dicarboxylate composition that contains magnesium, calcium, phosphorus and antimony compounds (in this case, only antimony acetate is acceptable as an antimony compound) in such amounts that satisfy the following expressions (81) to (84):

$$2.6 \leq (Mg+Ca) \leq 4.1 \tag{81}$$

$$1.3 \leq Mg/Ca \leq 6.0 \tag{82}$$

$$1.0 \leq P/(Mg+Ca) \leq 1.5 \tag{83}$$

$$1.0 \leq Sb \leq 3.0 \tag{84}$$

wherein Mg, Ca, P and Sb are the same as defined in the above expressions (61) to (64),
and that further contains an ammonium compound represented by the following formula (85) in an amount of 0.04 to 0.4 mole based on $10^6$ g of an acid component constituting the polyester:

$$(R^1R^2R^3R^4N^+)A^- \tag{85}$$

wherein $R^1$, $R^2$, $R^3$ and $R^4$ are each a hydrogen atom, an alkyl group, a cycloalkyl group, an aryl group or a derivative group thereof or $R^3$ and $R^4$ may form a ring, and A is a residual anion group.

JP-A 8-104744 discloses a method in which magnesium, calcium, phosphorus and antimony compounds are added in such amounts that satisfy the following expressions (91) to (94) when a lower alkylester of naphthalene dicarboxylic acid is reacted with ethylene glycol to produce polyethylene naphthalate:

$$1.0 \leq Ca+Mg \leq 2.6 \tag{91}$$

$$3.0 \leq Mg/Ca \leq 6.0 \tag{92}$$

$$2.3 \leq (Ca+Mg)/P \leq 7.0 \tag{93}$$

$$0.4 \leq Sb \leq 2.0 \tag{94}$$

wherein Ca, Mg, P and Sb are the same as defined in the above expressions (61) to (64).

JP-A 7-258394 discloses a polyester, which comprises naphthalene dicarboxylic acid as a main acid component and ethylene glycol as a main glycol component and contains manganese, phosphorus and antimony compounds in such amounts that satisfy the following expressions (101), (102) and (103):

$$0.7 \leq Mn \leq 1.7 \tag{101}$$

$$0.5 \leq Mn/P \leq 1.2 \tag{102}$$

$$1.0 \leq Sb \leq 3.0 \tag{103}$$

wherein P and Sb are the same as defined in the above expressions (61) to (64) and Mn indicates the number of moles of element manganese in a manganese compound, based on 1 ton of an acid component constituting the polymer.

The polyester has the transmittance ($T_{400}$) at a wavelength of 400 nm of 95 %/cm when it is dissolved in a mixed solvent of hexafluoroisopropanol and chloroform (proportion: 2:3) at the concentration of 10 mg/ml, and the difference between transmittance ($T_{400}$) and the transmittance ($T_{420}$) at a wavelength of 420 nm is 3 %/cm or less. The polyester is used for molding a bottle.

Copending U.S. Ser. No. 09/016,280 discloses a polyethylene-2,6-naphthalene dicarboxylate resin for molding a bottle which comprises 2,6-naphthalenedicarboxylic acid as a main acid component and ethylene glycol as a main glycol component and contains a germanium compound as a polycondensation catalyst, has an intrinsic viscosity of 0.55 to 0.75 dl/g, a terminal carboxyl group content of 32 eq/ton or less, an acetaldehyde content of 8 ppm or less and a diethylene glycol component content of 0.8 to 3.0 wt %.

Copending U.S. Ser. No. 09/033,701 discloses a polyethylene-2,6-naphthalene dicarboxylate resin for molding a bottle in which an antimony compound as a polycondensation catalyst is used instead of the germanium compound in the above resin of the copending U.S. Ser. No. 09/033,701.

However, all of the above prior arts fail to disclose specific examples of the ethylene-2,6-naphthalene dicarboxylate/ethylene terephthalate copolymer. Therefore, they are utterly silent about how much acetaldehyde is produced when these copolymers are kept molten under certain conditions.

It is therefore an object of the present invention to provide a copolyester for molding a bottle which is satisfactory in terms of thermal stability and is excellent in color and transparency.

It is another object of the present invention to provide a copolyester which produces only a small amount of acetaldehyde when it is kept molten with stirring and accordingly, can supress the smell of acetaldehyde from transferring to the contents of a bottle molded thereof because the bottle has a small content of acetaldehyde.

It is still another object of the present invention to provide a copolyester for molding a bottle which can provide an intimate blend by the short-time operation of blending it with a polyethylene-2,6-naphthalene homopolymer.

It is a further object of the present invention to provide a copolyester for molding a bottle which can provide a bottle having excellent transparency in a short molding time.

Other objects and advantages of the present invention will become apparent from the following description.

According to the present invention, the above objects and advantages of the present invention can be attained by a copolyester for molding a bottle, which comprises 95 to 87 mol % of naphthalenedicarboxylic acid and 5 to 13 mol % of terephthalic acid as acid components and a diol component consisting essentially of ethylene glycol, has an acetaldehyde content of 20 ppm or less and an intrinsic viscosity of 0.40 to 0.85 dl/g, and produces acetaldehyde in an amount of 30 ppm or less when this copolyester is kept molten with stirring at 300° C. for 5 minutes.

The copolyester of the present invention comprises 95 to 87 mol % of naphthalenedicarboxylic acid units and 5 to 13 mol % of terephthalic acid units as acid components. When the amount of terephthalic acid units is larger than 13 mol %, the amorphous phase of the copolyester becomes strong, thereby making it difficult to crystallize and dry it at the time of molding and solid-phase polymerization. When the amount of terephthalic acid units is smaller than 5 mol %, the melting point of the copolyester becomes high, thereby making it impossible to reduce the molding temperature, increasing the amount of acetaldehyde (to be referred to as "regenerated acetaldehyde" hereinafter) produced when a solid copolyester is molten, taking time to ensure transparency and extending the molding cycle.

The copolyester of the present invention preferably comprises 95 to 90 mol % of naphthalenedicarboxylic acid units and 5 to 10 mol % of terephthalic acid units as dicarboxylic acid components. The naphthalenedicarboxylic acid is preferably 2,6-naphthalenedicarboxylic acid.

The diol component constituting the copolyester of the present invention consists essentially of ethylene glycol. Other glycol may be used in an amount of 10 mol % or less of the total of all diol components in limits not prejudicial to the object of the present invention. Illustrative examples of the other glycol include trimethylene glycol, tetramethylene glycol, hexamethylene glycol, decamethylene glycol, neopentyl glycol, diethylene glycol, 1,1-cyclohexanedimethanol, 1,4-cyclohexanedimethanol, 2,2-bis(4'-β-hydroxyphenyl)propane, bis(4'-β-hydroxyethoxyphenyl)sulfone and the like. They may be used alone or in combination of two or more.

The copolyester of the present invention has an intrinsic viscosity of 0.40 to 0.85 dl/g. When the intrinsic viscosity is lower than 0.40 dl/g, the cracking of a chip frequently occurs in the step of making the copolyester into chips and when the intrinsic viscosity is higher than 0.85, the transparency of a bottle molded thereof deteriorates and the amount of acetaldehyde in the bottle increases due to heat deterioration disadvantageously.

Preferably, the copolyester of the present invention which has an intrinsic viscosity of 0.40 to 0.60 dl/g is produced by melt polymerization, and the copolyester of the present invention which has an intrinsic viscosity of more than 0.60 dl/g and 0.85 dl/g or less is produced by solid-phase polymerization.

The copolyester of the present invention has an acetaldehyde content of 20 ppm or less and produces acetaldehyde in an amount of 30 ppm or less when it is kept molten with stirring at 300° C. for 5 minutes. In the copolyester of the present invention, an acetaldehyde content after kept molten with stirring at 300° C. for 5 minutes (i.e., total amount of acetaldehyde before the copolyester is kept molten and acetaldehyde produced when the copolyester is kept molten) is preferably 40 ppm or less.

Preferably, the copolyester of the present invention which has an intrinsic viscosity of 0.40 to 0.60 dl/g has an acetaldehyde content of 20 ppm or less and produces acetaldehyde in an amount of 10 to 25 ppm when it is kept molten with stirring at 300° C. for 5 minutes and the copolyester of the present invention which has an intrinsic viscosity of more than 0.60 dl/g and 0.85 dl/g or less has an acetaldehyde content of 10 ppm or less and produces acetaldehyde in an amount of 20 to 25 ppm when it is kept molten with stirring at 300° C. for 5 minutes.

The copolyester of the present invention shows the dependence of the amount of acetaldehyde upon melting temperature and melting time which satisfy the following expression (1) when it is subjected to melt molding.

$$3\times10^{18}\exp(-2.67\times10^4/T) < \Delta AA/t < 2.6\times10^6\exp(-9.82\times10^3/T) \quad (1)$$

wherein T(°K) is a melting temperature, t(second) is a melting retention time and ΔAA (ppm) is an amount of acetaldehyde produced.

In the above expression (1), T is preferably in the range of 300 to 340° K. and t is preferably in the range of 90 to 360 seconds.

The copolyester of the present invention can be advantageously produced by an ester exchange method. Germanium dioxide and antimony trioxide are preferably used as a polymerization catalyst.

A description is first given of the method using germanium dioxide as a polymerization catalyst.

To a lower alkyl ester of naphthalenedicarboxylic acid, a lower alkyl ester of terephthalic acid and ethylene glycol are added 2 to 20 mmol % of a cobalt compound and 30 to 150 mmol % of a combination of a calcium compound and a magnesium compound based on the total of the lower alkyl esters, as ester exchange reaction catalysts.

The purpose of adding the cobalt compound is to suppress yellowing which causes deterioration in color, in addition to the effect of an ester exchange reaction catalyst. When the amount of the cobalt compound added is smaller than 2 mmol %, the effect is not exhibited, while when the amount is larger than 20 mmol %, the obtained copolyester becomes gray, thus deteriorating color.

Meanwhile, when the total amount of the calcium compound and the magnesium compound is larger than 150 mmol %, a whitening phenomenon is observed at the time of molding due to the influence of deposited particles produced by the residual catalyst, thereby impairing transparency. When the total amount is smaller than 30 mmol %, an ester exchange reaction is insufficient and a subsequent polymerization reaction slows down.

The molar ratio of the magnesium compound to the calcium compound is in the range of 1.5 to 5.5. When the molar ratio exceeds 5.5 or smaller than 1.5, particles are deposited by the residual catalyst and a whitening phenomenon is caused at the time of molding, thereby impairing transparency.

In the present invention, a phosphorus compound is added to deactivate the ester exchange catalysts. The molar radio of the phosphorus compound to the total of the cobalt compound, the calcium compound and the magnesium compound must be in the range of 1.0 to 1.5. When the molar ratio is smaller than 1.0, the ester exchange catalysts are not completely deactivated and thermal stability deteriorates, whereby the polymer may be colored or reductions in physical properties may occur at the time of molding. On the other hand, when the molar ratio is larger than 1.5, thermal stability deteriorates.

The calcium compound and the magnesium compound used in the present invention may be oxides, chlorides, carbonates or carboxylates of calcium and magnesium, respectively. Of these, acetates, that is, calcium acetate and magnesium acetate are preferred.

Illustrative examples of the phosphorus compound used as a stabilizer in the present invention include trimethyl phosphate, triethylene phosphate, tri-n-butyl phosphate and orthophosphoric acid. Of these trimethyl phosphate is preferred.

The germanium compound used as a polymerization reaction catalyst is preferably germanium dioxides. Of these, amorphous germanium dioxide having no crystal form is preferred. When amorphous germanium dioxide is used, there is obtained a polymer having a smaller amount of deposited particles and higher transparency than a case where ordinary germanium dioxide having a crystal form is used. When the amount of amorphous germanium dioxide is too small, polymerization reactivity lowers with the result of low productivity, while when the amount is too large, thermal stability lowers with the result of reductions in physical properties and deterioration in color at the time of molding. Therefore, the amount of amorphous germanium dioxide is preferably 10 to 50 mmol % of the total of all acid components.

As for the times of adding the above various catalysts and stabilizer, the cobalt compound, the calcium compound and the magnesium compound are all preferably added during the initial stage of an ester exchange reaction from the beginning of the reaction. The phosphorus compound can be added after the ester exchange reaction substantially finishes and before the intrinsic viscosity reaches 0.3. The germanium compound is preferably added 10 minutes or more before the phosphorus compound is added and before the intrinsic viscosity reaches 0.2.

Thus, according to the above method using germanium dioxide as a polymerization catalyst, there can be obtained the copolyester of the present invention which comprises a cobalt compound, a magnesium compound, a calcium compound and a phosphorus compound in such amounts that satisfy the following expressions (2) to (6):

$$2 \leq Co \leq 20 \tag{2}$$

$$30 \leq (Mg+Ca) \leq 150 \tag{3}$$

$$1.5 \leq (Mg/Ca) \leq 5.5 \tag{4}$$

$$1.0 \leq P/(Co+Ca+Mg) \leq 1.5 \tag{5}$$

$$10 \leq Ge \leq 50 \tag{6}$$

wherein Co, Mg, Ca and Ge are mmol % of cobalt element, magnesium element, calcium element and germanium element based on the total of all dicarboxylic acid components, respectively.

A description is subsequently given of the method using antimony trioxide as a polymerization catalyst.

To a lower alkali ester of naphthalenedicarboxylic acid and a lower alkali ester of terephthalic acid as acid components and ethylene glycol as a diol component are added 2 to 20 mmol % of a cobalt compound containing cobalt element and 10 to 60 mmol % of a manganese compound containing manganese element based on the total of all acid components, as ester exchange reaction catalysts. In this respect, the purpose of adding the cobalt compound is to suppress yellowing which causes deterioration in color, in addition to the effect of an ester exchange reaction catalyst. When the amount of the cobalt compound is smaller than 2 mmol %, the above effect is not exhibited, while when the amount is larger than 20 mmol %, the obtained copolyester becomes gray, thus deteriorating color.

When the amount of the manganese compound is larger than 60 mmol %, a whitening phenomenon is observed at the time of molding due to the influence of deposited particles produced by the residual catalyst, thereby impairing transparency. When the amount is smaller than 10 mmol %, the ester exchange reaction is insufficient and a subsequent polymerization reaction slows down.

Further, a phosphorus compound is added to deactivate the ester exchange catalysts. The molar radio of the phosphorus compound to the total of the cobalt compound and the manganese compound must be in the range of 0.7 to 1.5. When the molar ratio is smaller than 0.7, the ester exchange catalysts are not completely deactivated and thermal stability deteriorates, whereby the polymer may be colored or reductions in physical properties may occur at the time of molding. On the other hand, when the molar ratio is larger than 1.5, thermal stability deteriorates.

The manganese compound and the cobalt compound used in the present invention may be oxides, chlorides, carbonates or carboxylates of manganese and cobalt, respectively. Of these, acetates, that is, manganese acetate and cobalt acetate are preferred.

Illustrative examples of the phosphorus compound include trimethyl phosphate, triethylene phosphate, tri-n-butyl phosphate and orthophosphoric acid. Of these, trimethyl phosphate is preferred.

Antimony trioxide is used as a polymerization catalyst from the view point of color. When the amount of antimony trioxide added is smaller than 5 mmol %, polymerization reactivity lowers with the result of low productivity, while when the amount is larger than 40 mmol %, thermal stability deteriorates with the result of eductions in physical properties and deterioration in color. Therefore, the amount must be in the range of 5 to 40 mmol %.

As for the times of adding the above various catalysts and stabilizer, the cobalt compound and the agnesium compound are all preferably added during the initial stage of an ester exchange reaction from the beginning of the reaction. The phosphorus compound can be added after the ester exchange reaction substantially terminates and before the intrinsic viscosity reaches 0.3. The antimony compound is preferably added 10 minutes or more before the phosphorus compound is added and before the intrinsic viscosity reaches 0.2.

According to the above method using antimony trioxide as a polymerization catalyst, there can be obtained the copolyester of the present invention which comprises a cobalt compound, a manganese compound and an antimony compound in such amounts that satisfy the following expressions (2), (7), (8) and (9):

$$2 \leq Co \leq 20 \tag{2}$$

$$10 \leq Mn \leq 60 \tag{7}$$

$$0.7 \leq P/(Co+Mn) \leq 1.5 \tag{8}$$

$$5 \leq Sb_2O_3 \leq 40 \tag{9}$$

wherein Co, Mn, P and $Sb_2O_3$ are mmol % of cobalt element, manganese element, phosphorus element and $Sb_2O_3$ based on the total of all dicarboxylic acid components.

The copolyester of the present invention can be used not only by itself as a raw material for producing a bottle but also as a polyester composition that is obtained by blending it with other material such as polyethylene terephthalate, for producing a bottle.

When the copolyester itself is used as a raw material for producing a bottle, the copolyester of the present invention preferably has an intrinsic viscosity of more than 0.60 dl/g and 0.85 dl/g or less. When a polyester composition is prepared by blending the polyester with other material such as polyethylene terephthalate, the copolyester of the present invention preferably has an intrinsic viscosity of 0.40 to 0.60 dl/g. When the other material is polyethylene terephthalate in the preparation of the above polyester composition, the copolyester of the present invention and polyethylene terephthalate may be used in a weight ratio of 95 to 5 parts by weight of the former to 5 to 95 parts by weight of the latter (in terms of totally 100 parts by weight).

Therefore, according to the present invention, there are also provided a preform for a bottle and a bottle formed from the copolyester itself of the present invention or a polyester composition comprising the copolyester of the present invention and polyethylene terephthalate.

The following examples are given to further illustrate the present invention. In the following examples, "parts" means "parts by weight".

(1) Intrinsic viscosity ([η]):
  This is measured at 35° C. in a tetrachloroethane/phenol mixed solvent (mixing ratio of 4:6).
(2) Col-L, b (color):
  The polymer is heated in a drier at 160° C. for 90 minutes to be crystallized and measured for its color using the CM-7500 Color Machine of Color Machine Co., Ltd.
(3) Haze (transparency):
  The polymer is dried at 160° C. for 5 hours, and a preform of 55 g is molded thereof at a molding temperature of 300° C. using the 100 DM injection molding machine of Meiki Seisakusho Co., Ltd. This preform is subjected to a blow molding to be formed into a bottle having an inner volume of 1.5 liters and a barrel thickness of 300 pm. The haze of the barrel portion of the bottle is measured using the turbidimeter of Nippon Denshoku Kogyo Co., Ltd.
(4) Acetaldehyde content (abbreviated as AA):
  The sample is freeze ground and measured for its acetaldehyde content by HS-GC (of Hitachi Ltd.)
(5) Element content of polymer
  This is measured by fluorescent X rays in accordance with a conventional method.
(6) Measurement of amount of AA regenerated
  The sample is kept molten with stirring in a rheometer at a predetermined temperature (300° C.) for a predetermined period of time. The revolution of the stirrer is 50 rpm. The sample is measured for its AA amounts before and after molding and the difference between them is taken as an amount of AA generated.

EXAMPLE 1

227 Parts of dimethyl 2,6-naphthalene dicarboxylate (to be abbreviated as NDC hereinafter), 14 parts of dimethyl terephthalate (to be abbreviated as DMT hereinafter) and 62 parts of ethylene glycol (to be abbreviated as EG hereinafter) were subjected to an ester exchange reaction in the presence of 0.025 part of cobalt acetate tetrahydrate (to be abbreviated as Co hereinafter), 0.035 part of calcium acetate monohydrate (to be abbreviated as Ca hereinafter) and 0.107 part of magnesium acetate tetrahydrate (to be abbreviated as Mg hereinafter) as ester exchange catalysts in accordance with a commonly used method. At the stage of substantial termination of the ester exchange reaction, 3.1 parts of a 1% amorphous germanium dioxide solution in EG (to be abbreviated as Ge hereinafter) was added and then 0.14 part of trimethyl phosphate (to be abbreviated as P hereinafter) was added to terminate the ester exchange reaction.

Subsequently, a polycondensation reaction was carried out at a high temperature and a high degree of vacuum in accordance with a commonly used method and then a strand chip was obtained. The intrinsic viscosity of the obtained polymer was 0.5 dl/g and the polymerization time was 70 minutes.

Further, the prepolymer was heated to be crystallized in the polymerization in solid-phase in accordance with a commonly used method. The obtained polymer had an intrinsic viscosity of 0.68 dl/g and an acetaldehyde content of 5.2 ppm.

EXAMPLES 2 to 5 AND COMPARATIVE EXAMPLES 1 AND 2

The procedure of Example 1 was repeated except that the amounts and ratios of dimethyl 2,6-naphthalene dicarboxylate, dimethyl terephthalate, cobalt acetate tetrahydrate, magnesium acetate tetrahydrate, calcium acetate monohydrate, trimethyl phosphate and germanium dioxide were changed as shown in Table 1.

The qualities and evaluation results of the obtained polymers are shown in Table 2.

TABLE 1

| | Amount of catalyst (mmol %) | | | | | Co + Ca + Mg | Mg/Ca | P/(Co + Ca + Mg) | NDC/DMT (molar ratio) |
| --- | --- | --- | --- | --- | --- | --- | --- | --- | --- |
| | Co | Ca | Mg | P | Ge | | | | |
| Ex. 1 | 10 | 20 | 50 | 100 | 30 | 80 | 2.5 | 1.25 | 93/7 |
| Ex. 2 | 10 | 20 | 50 | 100 | 30 | 80 | 2.5 | 1.25 | 90/10 |
| Ex. 3 | 3 | 20 | 50 | 100 | 35 | 73 | 2.5 | 1.37 | 93/7 |
| Ex. 4 | 3 | 20 | 50 | 105 | 35 | 73 | 2.5 | 1.44 | 95/5 |
| Ex. 5 | 3 | 15 | 55 | 85 | 25 | 73 | 3.7 | 1.16 | 95/5 |
| C. Ex. 1 | 3 | 20 | 50 | 100 | 30 | 73 | 2.5 | 1.37 | 97/3 |
| C. Ex. 2 | 3 | 20 | 50 | 100 | 30 | 73 | 2.5 | 1.37 | 86/20 |

Ex. = Example,
C. Ex. = Comparative Example.

TABLE 2

| | Prepolymer | | | | | | After solid-phase polymerization | | | Bottle haze (%) |
| --- | --- | --- | --- | --- | --- | --- | --- | --- | --- | --- |
| | Polymerization time (min.) | [η] (dl/g) | Col − L/b | Tm (° C.) | AA (ppm) | ΔAA (ppm) | [η] (dl/g) | AA (ppm) | ΔAA (ppm) | |
| Ex. 1 | 70 | 0.50 | 85.0/−5.2 | 253 | 10 | 18 | 0.68 | 5.2 | 25 | 1.2 |
| Ex. 2 | 79 | 0.50 | 84.2/−4.2 | 240 | 9 | 20 | 0.70 | 3.0 | 26 | 1.3 |
| Ex. 3 | 70 | 0.56 | 84.5/−4.8 | 253 | 15 | 22 | 0.77 | 2.5 | 28 | 0.9 |
| Ex. 4 | 69 | 0.53 | 85.3/−5.3 | 256 | 13 | 21 | 0.74 | 2.3 | 27 | 1.2 |
| Ex. 5 | 80 | 0.50 | 84.2/−4.3 | 256 | 8 | 15 | 0.74 | 2.4 | 20 | 1.0 |
| C. EX. 1 | 70 | 0.50 | 84.3/−4.2 | 260 | 23 | 25 | 0.70 | 8.0 | 35 | 1.5 |
| C. EX. 2 | 90 | 0.52 | 83.5/−3.7 | — | 100 | 27 | 0.68 | 2.5 | 39 | 1.8 |

Ex. = Example,
C. EX. = Comparative Example.

EXAMPLE 6

227 Parts of NDC, 14 parts of DMT and 62 parts of EG were subjected to an ester exchange reaction in the presence of 0.025 part of Co and 0.074 part of manganese acetate monohydrate (may be abbreviated as Mn hereinafter) as ester exchange catalysts in accordance with a commonly used method. After substantial termination of the ester exchange reaction, 2.92 parts of a 1 % antimony trioxide solution in EG (may be abbreviated as Sb hereinafter) was added and then 0.07 part of P was added to terminate the ester exchange reaction. A polycondensation reaction was carried out at a high temperature and a high degree of vacuum in accordance with a commonly used method and then a strand chip was formed. The intrinsic viscosity of the obtained polymer was 0.5 dl/g and the polymerization time was 70 minutes. Further, the prepolymer was polymerized in a solid-phase in accordance with a commonly used method. The obtained polymer had an intrinsic viscosity of 0.7 dl/g and an acetaldehyde content of 3 ppm.

EXAMPLES 7 TO 10 AND COMPARATIVE EXAMPLES 3 AND 4

The procedure of Example 6 was repeated except that the amounts and ratios of dimethyl 2,6-naphthalene dicarboxylate, dimethyl terephthalate, cobalt acetate tetrahydrate, manganese acetate tetrahydrate, trimethyl phosphate and antimony trioxlde were changed as shown in Table 3.

The qualities and evaluation results of the obtained polymers are shown in Table 4.

TABLE 3

| | Amount of catalyst (mmol %) | | | | | | NDC/DMT (molar ratio) |
|---|---|---|---|---|---|---|---|
| | Co | Mn | P | Sb | Co + Mn | P/(Co + Mn) | |
| Ex. 6 | 10 | 30 | 50 | 10 | 40 | 1.25 | 92/8 |
| Ex. 7 | 10 | 30 | 50 | 10 | 40 | 1.25 | 90/10 |
| Ex. 8 | 10 | 40 | 50 | 10 | 50 | 1.0 | 93/7 |
| Ex. 9 | 3 | 30 | 40 | 10 | 33 | 1.21 | 95/5 |
| Ex. 10 | 3 | 30 | 40 | 20 | 33 | 1.21 | 95/5 |
| C. Ex. 3 | 3 | 30 | 40 | 10 | 33 | 1.21 | 97/3 |
| C. Ex. 4 | 3 | 30 | 40 | 10 | 33 | 1.21 | 80/20 |

Ex. = Example,
C. Ex. = Comparative Example.

TABLE 4

| | Prepolymer | | | | | | After solid-phase polymerization | | | |
|---|---|---|---|---|---|---|---|---|---|---|
| | Polymerization time (min.) | [η] (dl/g) | Col – L/b | Tm (° C.) | AA (ppm) | ΔAA (ppm) | [η] (dl/g) | AA (ppm) | ΔAA (ppm) | Bottle haze (%) |
| Ex. 6 | 75 | 0.50 | 85.0/−5.7 | 253 | 12 | 18 | 0.70 | 3.0 | 24 | 1.2 |
| Ex. 7 | 79 | 0.50 | 84.2/−5.2 | 241 | 8 | 19 | 0.73 | 3.0 | 28 | 1.3 |
| Ex. 8 | 70 | 0.52 | 84.5/−5.5 | 254 | 15 | 15 | 0.74 | 2.5 | 27 | 0.8 |
| Ex. 9 | 73 | 0.53 | 85.3/−5.0 | 257 | 18 | 20 | 0.74 | 3.0 | 27 | 1.0 |
| Ex. 10 | 65 | 0.55 | 84.2/−5.5 | 257 | 17 | 22 | 0.78 | 2.0 | 29 | 0.9 |
| C. EX. 3 | 69 | 0.50 | 84.3/−4.2 | 261 | 21 | 24 | 0.71 | 7.0 | 38 | 1.5 |
| C. EX. 4 | 81 | 0.50 | 83.5/−3.7 | — | 90 | 25 | 0.68 | 2.2 | 34 | 1.5 |

Ex. = Example,
C. EX. = Comparative Example.

EXAMPLE 11

The solid-phase polymerization chips obtained in Examples 1 and 3 were molten under conditions shown in Table 5 below to produce a preform for a bottle. The acetaldehyde content of the obtained preform is shown together with ΔAA in Table 5.

TABLE 5

| | Molding conditions | | | Chip | | Preform | |
|---|---|---|---|---|---|---|---|
| Polymer used | cylinder temperature (° C.) | residence time t (sec) | resin temperature T (° C.) | intrinsic viscosity | AA (ppm) | AA (ppm) | ΔAA (ppm) |
| Ex. 1 | 290 | 90 | 325 | 0.68 | 5.2 | 16.9 | 11.7 |
| Ex. 3 | 290 | 90 | 328 | 0.77 | 3.5 | 19.5 | 16 |
| Ex. 1 | 300 | 90 | 327 | 0.68 | 5.2 | 20 | 14.8 |
| Ex. 3 | 300 | 90 | 334 | 0.77 | 3.5 | 27.7 | 24.2 |
| Ex. 1 | 310 | 90 | 333 | 0.68 | 5.2 | 26.8 | 21.6 |
| Ex. 3 | 310 | 90 | 336 | 0.77 | 3.5 | 34.7 | 25 |

Ex. = Example,
C. EX. = Comparative Example.

What is claimed is:

1. A copolyester for molding a bottle which comprises 95 to 87 mol % of naphthalenedicarboxylic acid and 5 to 13 mol % of terephthalic acid as dicarboxylic acid components and a diol component consisting essentially of ethylene glycol, has an acetaldehyde content of 20 ppm or less and an intrinsic viscosity of 0.40 to 0.85 dl/g, and produces acetaldehyde in an amount of 30 ppm or less when the copolyester is kept molten with stirring at 300° C. for 5 minutes.

2. The copolyester of claim 1, wherein the dicarboxylic acid components are 95 to 90 mol % of naphthalenedicarboxylic acid and 5 to 10 mol % of terephthalic acid.

3. The copolyester of claim 1, the amount ($\Delta AA$, (ppm)) acetaldehyde produced when the copolyester is melt molded at a melting temperature (T, °K) for a time (t, second) satisfies the following expression (1):

$$3 \times 10^{18} \exp(-2.67 \times 10^4/T) < \Delta AA/t < 2.6 \times 10^6 \exp(-9.82 \times 10^3/T). \quad (1)$$

4. The copolyester of claim 1 which has an intrinsic viscosity of 0.40 to 0.60 dl/g and an acetaldehyde content of 20 ppm or less and produces acetaldehyde in an amount of 10 to 25 ppm when the copolyester is kept molten with stirring at 300° C. for 5 minutes.

5. The copolyester of claim 1 which has an intrinsic viscosity of more than 0.60 dl/g and 0.85 dl/g or less and an acetaldehyde content of 10 ppm or less and produces acetaldehyde in an amount of 20 to 25 ppm when the copolyester is kept molten with stirring at 300° C. for 5 minutes.

6. The copolyester of claim 1 which comprises a cobalt compound, a magnesium compound, a calcium compound and a phosphorus compound in such amounts that satisfy the following expressions (2) to (5):

$$2 \leq Co \leq 20 \quad (2)$$

$$30 \leq (Mg+Ca) \leq 150 \quad (3)$$

$$1.5 \leq (Mg/Ca) \leq 5.5 \quad (4)$$

$$1.0 \leq P/(Co+Ca+Mg) \leq 1.5 \quad (5)$$

$$10 \leq Ge \leq 50 \quad (6)$$

wherein Co, Mg, Ca and Ge are mmol % of cobalt element, magnesium element, calcium element and germanium element based on the total of all dicarboxylic acid components, respectively.

7. The copolyester of claim 1 which comprises a cobalt compound, a manganese compound and an antimony compound in such amounts that satisfy the following expressions (2), (7), (8) and (9):

$$2 \leq Co \leq 20 \quad (2)$$

$$10 \leq Mn \leq 60 \quad (7)$$

$$0.7 \leq P/(Co+Mn) \leq 1.5 \quad (8)$$

$$5 \leq Sb_2O_3 \leq 40 \quad (9)$$

wherein Co, Mn, P and $Sb_2O_3$ are mmol % of cobalt element, manganese element, phosphorus element and $Sb_2O_3$ based on the total of all dicarboxylic acid components.

8. A preform for a bottle, which is formed from the copolyester of claim 1.

9. A bottle formed from the copolyester of claim 1.

10. A method for preparing a polyester composition for molding a bottle comprising blending the copolyester of claim 1 having an intrinsic viscosity of 0.40 to 0.60 dl/g with polyethylene terephthalate.

11. A polyester composition for molding a bottle comprising the copolyester of claim 1 having an intrinsic viscosity of 0.40 to 0.60 dl/g and polyethylene terephthalate.

* * * * *